United States Patent
Nagano et al.

(10) Patent No.: US 8,615,146 B2
(45) Date of Patent: Dec. 24, 2013

(54) PLANAR OPTICAL WAVEGUIDE

(75) Inventors: Mitsuru Nagano, Yokohama (JP); Akira Himeno, Yokohama (JP); Masayuki Okuno, Yokohama (JP); Masahiko Naito, Yokohama (JP); Akihito Doi, Yokohama (JP); Daisuke Ogawa, Yokohama (JP); Akira Nagai, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 334 days.

(21) Appl. No.: 13/002,860

(22) PCT Filed: Jul. 29, 2009

(86) PCT No.: PCT/JP2009/063493
§ 371 (c)(1),
(2), (4) Date: Jan. 6, 2011

(87) PCT Pub. No.: WO2010/013747
PCT Pub. Date: Feb. 4, 2010

(65) Prior Publication Data
US 2011/0110629 A1      May 12, 2011

(30) Foreign Application Priority Data
Jul. 30, 2008   (JP) .................. 2008-197007

(51) Int. Cl.
*G02B 6/12*          (2006.01)
(52) U.S. Cl.
USPC .......................................................... 385/14
(58) Field of Classification Search
None
See application file for complete search history.

(56) References Cited

U.S. PATENT DOCUMENTS

| | | | | |
|---|---|---|---|---|
| 6,480,639 B2 * | 11/2002 | Hashimoto et al. | ............. | 385/14 |
| 7,340,114 B2 * | 3/2008 | Doi et al. | ............ | 385/2 |
| 2002/0001427 A1 * | 1/2002 | Hashimoto et al. | ............. | 385/14 |
| 2002/0006245 A1 * | 1/2002 | Kubota et al. | ................... | 385/14 |
| 2006/0159384 A1 * | 7/2006 | Sugiyama | ........................ | 385/3 |
| 2008/0247708 A1 * | 10/2008 | Ohmori et al. | .................. | 385/14 |
| 2012/0251041 A1 * | 10/2012 | Ishikawa et al. | ................ | 385/14 |

FOREIGN PATENT DOCUMENTS

| | | |
|---|---|---|
| JP | 9-005548 | 1/1997 |
| JP | 11-052154 | 2/1999 |
| JP | 11-352344 | 12/1999 |
| JP | 2002-182050 A | 6/2002 |
| JP | 3755762 | 1/2006 |
| JP | 2006-038897 | 2/2006 |
| JP | 2006-065089 A | 3/2006 |

OTHER PUBLICATIONS

Hashizume, et al., "Compact 32-channel 2×2 optical switch array based on PLC technology for OADM systems", ECOC2003, M03-5-4, consisting of 2 pages.

(Continued)

*Primary Examiner* — Sung Park
(74) *Attorney, Agent, or Firm* — Ohlandt Greeley Ruggiero & Perle L.L.P.

(57) ABSTRACT

A planar optical waveguide including a clad layer, an optical waveguide having a core embedded in the clad layer; and a groove formed in the clad layer and having a reflection interface for totally reflecting a leaked light leaked from the optical waveguide to the clad layer. Since the reflection interface for totally reflecting the leaked light is formed in the clad layer, the leaked light is prevented from entering into the tap coupler, and the variation of the branching ratio can be reduced.

22 Claims, 10 Drawing Sheets

(56) References Cited

OTHER PUBLICATIONS

International Search Report dated Sep. 1, 2009 for corresponding International Patent Application No. PCT/JP2009/063493 (w/ English translation).

International Preliminary Report on Patentability for corresponding International Patent Application No. PCT/JP2009/063493 (with English translation).
Notification of Reasons for Refusal dated Nov. 13, 2012 for corresponding Japanese Patent Application No. 2008-197007 with English translation consisting of 6 pages.

* cited by examiner

PLANAR OPTICAL WAVEGUIDE

This application is a national stage application under 35 U.S.C. 371 of PCT application No. PCT/JP2009/063493 having an international filing date of Jul. 29, 2009, which designated the United States, which claimed the benefit of Japanese application No. 2008-197007, filed Jul. 30, 2008.

BACKGROUND

1. Field of the Disclosure

The present disclosure relates to an optical device used for an optical communication system, and more particularly to a planar optical waveguide constituted by an optical waveguide including a clad layer and a core embedded in the clad layer which are formed on a substrate.

2. Discussion of the Background Art

A planar optical waveguide having an optical circuit such as an optical switch (for example, see Japanese Patent Publication No. 3755762 and Y. Hashizume, et. al., "Compact 32-channel 2×2 optical switch array based on PLC technology for OADM systems", ECOC2003, M03-5-4) is used as an optical device for an optical communication system. ROADM (Reconfigurable Optical Add Drop Multiplexer) using a wavelength-multiplexed signal is one of optical communication system nodes constituted by the planar optical waveguides. This ROADM has a function of exchanging only a desired WDM channel signal in a node with a lower layer network and thereafter transmitting all the signals to an adjacent node, and this ROADM method is mainly used for constituting a ring network. In order to achieve this function, a high-functionality optical device in which planar optical waveguides are integrated in one module has been suggested.

FIG. 10 illustrates an example of a conventional planar optical waveguide. A light output from a MZI (Mach-Zehnder Interferometer) 51 constituting an optical circuit is divided into two, and one of the lights is input to a tap coupler 52. The light entered into the tap coupler 52 is divided into two, and one of the lights is output from an output end 53a as an optical output, and the other of the lights is output from an output end 53b as a monitoring output. A monitoring PD (Photo Detector) detects the intensity of the light output from the output end 53b. In the conventional planar optical waveguide, the MZI 51 and the tap coupler 52 are arranged substantially on the same straight line in order to increase the density of integration of the planar optical waveguide.

In the past, the tap coupler and the MZI are arranged substantially on the same straight line, therefore, a leaked light leaked from the core of the MZI to the clad layer enters into the tap coupler to vary a branching ratio.

Accordingly, it is an object of the present disclosure to prevent the leaked light leaked from the MZI from entering into the tap coupler and reduce the variation of the branching ratio.

SUMMARY

To solve the above-described problem, a planar optical waveguide according to the present disclosure includes: a clad layer; an optical waveguide having a core embedded in the clad layer; and a groove formed in the clad layer and having a reflection interface for totally reflecting a leaked light leaked from the optical waveguide to the clad layer.

Since the reflection interface totally reflecting the leaked light is formed in the clad layer, the leaked light is prevented from entering into the tap coupler, and this can reduces the variation of the branching ratio.

The planar optical waveguide according to the present disclosure has a tap coupler, and the reflection interface totally reflects the leaked light propagated to the tap coupler, preferably.

Since the reflection interface totally reflects the leaked light propagated to the tap coupler, the leaked light is prevented from entering into the tap coupler, and this can reduces the variation of the branching ratio.

The planar optical waveguide according to the disclosure includes a plurality of the grooves, wherein each of the grooves includes: an incident interface for receiving a leaked light reflected by the reflection interface of another one of the grooves; and an output interface for outputting, to the clad layer, the leaked light entered into the groove through the incident interface, and wherein the output interface preferably outputs the leaked light with an angle of 45 degrees or more with respect to an axial direction of the tap coupler.

In some cases, the leaked light reflected by the reflection interface may enter into a tap coupler for an adjacent channel. Accordingly, the incident interface is arranged to once receive the leaked light reflected by the adjacent groove into the groove. Then the leaked light is emitted from the output interface with such an angle that the leaked light does not enter into another coupler. Therefore, the planar optical waveguide can have such a structure that the leaked light is less likely to enter into the tap coupler of another channel.

The planar optical waveguide according to present disclosure includes a plurality of the grooves, wherein each of the grooves includes: an incident interface for receiving a leaked light reflected by a reflection interface of another one of the grooves; and an output interface for outputting, to the clad layer, the leaked light entered into the groove through the incident interface, and wherein the incident interface is substantially in parallel with the axial direction, an angle between the incident interface and the reflection interface is 30 degrees, and an angle between the reflection interface and the output interface is preferably 120 degrees.

In some cases, the leaked light reflected by the reflection interface may enter into a tap coupler for an adjacent channel. Accordingly, the incident interface is arranged to once receive the leaked light reflected by the adjacent groove into the groove. Then the angles of the reflection interface and the output interface with respect to the incident interface are set at 30 degrees. Therefore, the planar optical waveguide can have such a structure that the leaked light is less likely to enter into the tap coupler of another channel.

In the planar optical waveguide according to the present disclosure, an angle of an axial direction of the tap coupler with respect to a normal line of the reflection interface is preferably equal to or more than a critical angle of the reflection interface but is equal to or less than 90 degrees.

The reflection interface can totally reflect the leaked light entering into the tap coupler from the axial direction of the tap coupler.

A planar optical waveguide according to the present disclosure includes: a clad layer; an optical waveguide having a core embedded in the clad layer; a groove formed in the clad layer; and a tap coupler, wherein an angle θ of an axial direction of the tap coupler with respect to a normal line of a first interface of the groove is equal to or more than a critical angle.

According to the present disclosure, the leaked light incident to the tap coupler with a small angle is prevented from entering into the tap coupler, and this can reduces the variation of the branching ratio.

The planar optical waveguide according to the present disclosure includes a plurality of the grooves, wherein the grooves include a second interface and a third interface, the second interface is substantially in parallel with the axial direction, and an angle $(\theta+\theta_r)$ formed by the third interface and the first interface preferably satisfies the expression 1.

In some cases, the leaked light reflected by the reflection interface may enter into a tap coupler for an adjacent channel. Accordingly, the second interface is arranged to once receive the leaked light reflected by the adjacent groove into the groove. Then the leaked light is emitted from the third interface with such an angle that the leaked light does not enter into another tap coupler. Therefore, the planar optical waveguide can have such a structure that the leaked light is less likely to enter into the tap coupler of another channel.

In the planar optical waveguide according to the present disclosure, the groove preferably includes a light shielding material for attenuating a intensity of a leaked light incident to the groove.

This can attenuate the intensity of the leaked light having entered into the groove from the reflection interface and the incident interface.

The present disclosure can prevent the leaked light leaked from the optical circuit from entering into the tap coupler, and reduces the variation of the branching ratio.

DETAILED DESCRIPTION OF THE PREFERRED EMBODIMENT

Embodiments of the present disclosure will be explained with reference to the attached drawings. The embodiments described below are exemplary configurations of the present disclosure, and it is to be understood that the present disclosure is not limited to the embodiments explained below.

Figure 1:
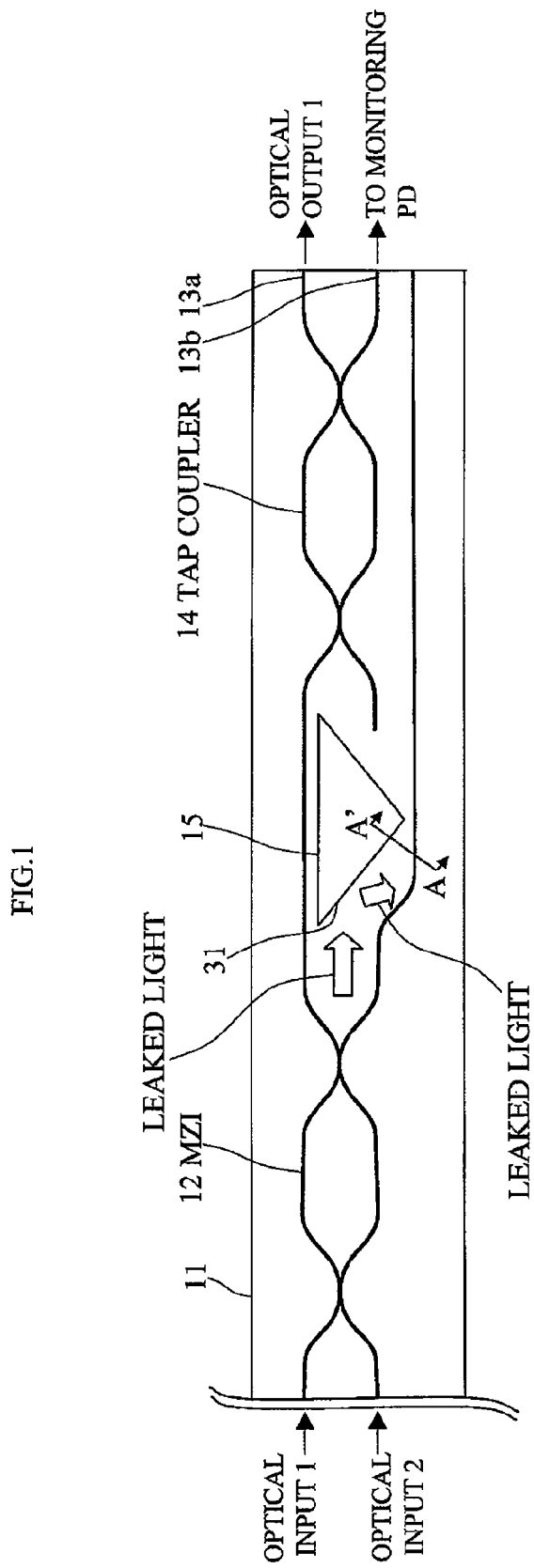
FIG. 1 is a schematic diagram illustrating a configuration of a planar optical waveguide according to a present embodiment.

FIG. 1 is a schematic diagram illustrating a configuration of a planar optical waveguide according to the present embodiment. The planar optical waveguide according to the present embodiment includes a substrate 11, an MZI 12 serving as an optical circuit, output ends 13a and 13b, a tap coupler 14, and a groove causing reflection 15, and then the MZI 12 and the tap coupler 14 are connected by an optical waveguide.

For example, the planar optical waveguide is manufactured according to the following steps. A single-mode optical waveguide, which includes a clad layer and an embedded core formed with silica glass on a silicon substrate having a thickness of 1 mm and a diameter of 6 in, is manufactured by a combination of a silica glass film deposition technique using flame hydrolysis decomposition reaction of feed gases such as $SiCL_4$ and $GeCl_4$ and a Reactive Ion Etching (RIE) technique, a thin film heater and electrodes for power supply are formed on a surface of the clad layer by vacuum deposition and patterning. The manufactured optical waveguide usually has a core diameter of 7 μm×7 μm and a relative refractive index difference Δ of 0.75% with respect to the clad layer.

The output ends 13a and 13b output lights propagated through the core of the MZI 12. The tap coupler 14 adjusts a branching ratio of a light propagated through the core of the MZI 12 to adjust signal levels of signals output from the output ends 13a and 13b. For example, the tap coupler 14 is a Wavelength INsensitive Coupler (WINC). The output ends 13a and 13b are connected to an AWG and a PD, respectively.

In the clad layer that fills a space between the MZI 12 and the tap coupler 14, the groove causing reflection 15 forms a reflection interface 31 that reflects a leaked light leaked from the core of the MZI 12 to the clad layer. The groove causing reflection 15 has boundaries with the clad layer, and one of them, i.e., a boundary surface facing the MZI 12, is a reflection interface 31 serving as a first interface.

Figure 2:
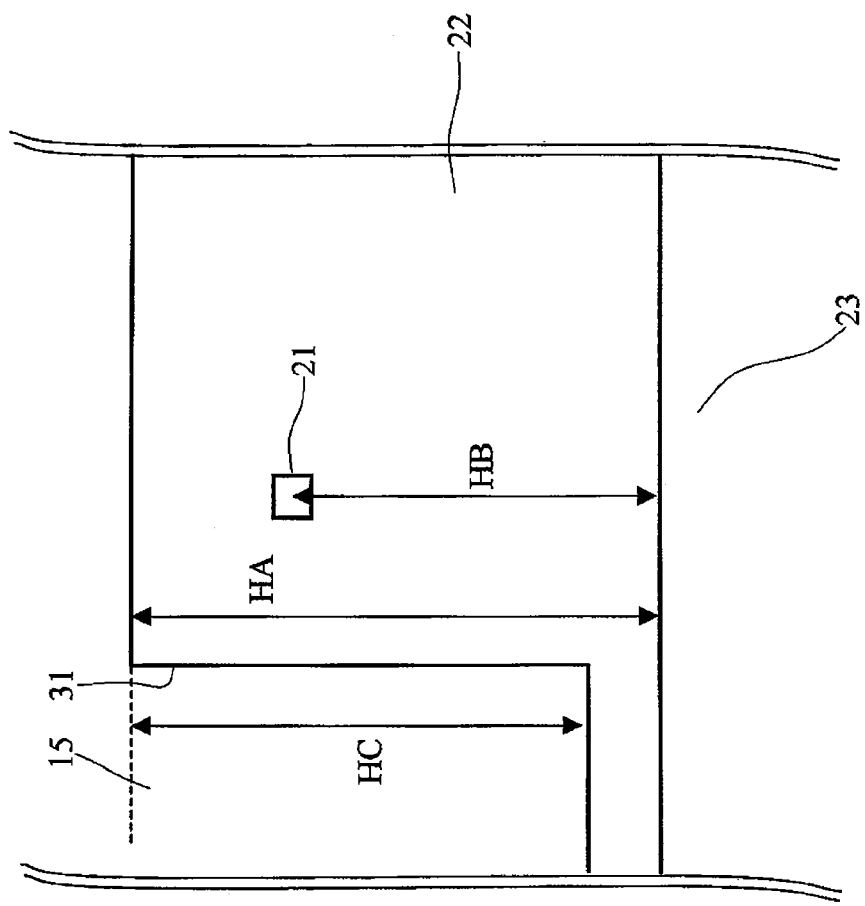
FIG. 2 is an example of a cross section taken along a line A-A'.

FIG. 2 is an example of a cross section taken along a line A-A'. A clad layer 22 and a core 21 are stacked on a substrate 23. The groove causing reflection 15 is formed by removing a portion of the clad layer 22 in such a manner that the removed portion reaches a position deeper than the core 21. For example, where a height HA of the clad layer 22 is about 60 μm, and a height HB from the substrate 23 to the center of the core 21 is 46 μm, a depth HC of the groove causing reflection 15 is 52 μm. The surface of the reflection interface 31 is preferably smooth. Therefore, it is preferable to use dry etching to remove the clad layer 22.

Figure 3:
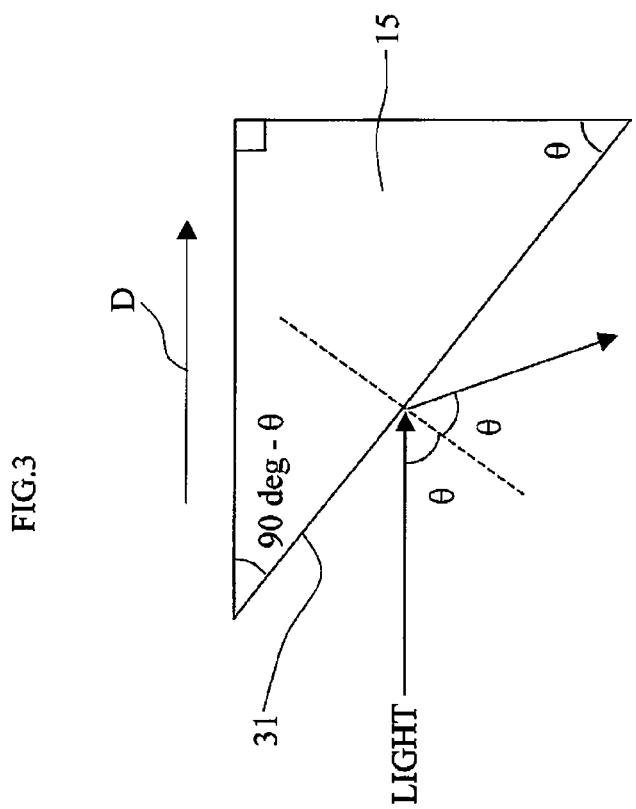
FIG. 3 is a schematic diagram illustrating an example of a groove causing reflection.

FIG. 3 is a schematic diagram illustrating the example of the groove causing reflection. The groove causing reflection 15 has a reflection interface 31, and an incident angle θ of the leaked light incident to the reflection interface 31 is equal to or more than a critical angle of the reflection interface 31. For example, the angle θ between the axial direction D of the tap coupler 14 and the normal line of the reflection interface 31 is equal to or more than the critical angle of the reflection interface 31. When the medium of the groove causing reflection 15 and the material of the clad layer are air and glass, the refractive indexes thereof are 1.00 and 1.46, respectively; accordingly, the critical angle of the reflection interface 31 is 43 degrees according to the Snell's law. Therefore, when the incident angle θ to the reflection interface 31 is between 43 degrees and 90 degrees, the leaked light is totally reflected, which can prevent the leaked light, varying the branching ratio of the tap coupler 14, from entering into the tap coupler 14.

Figure 4:
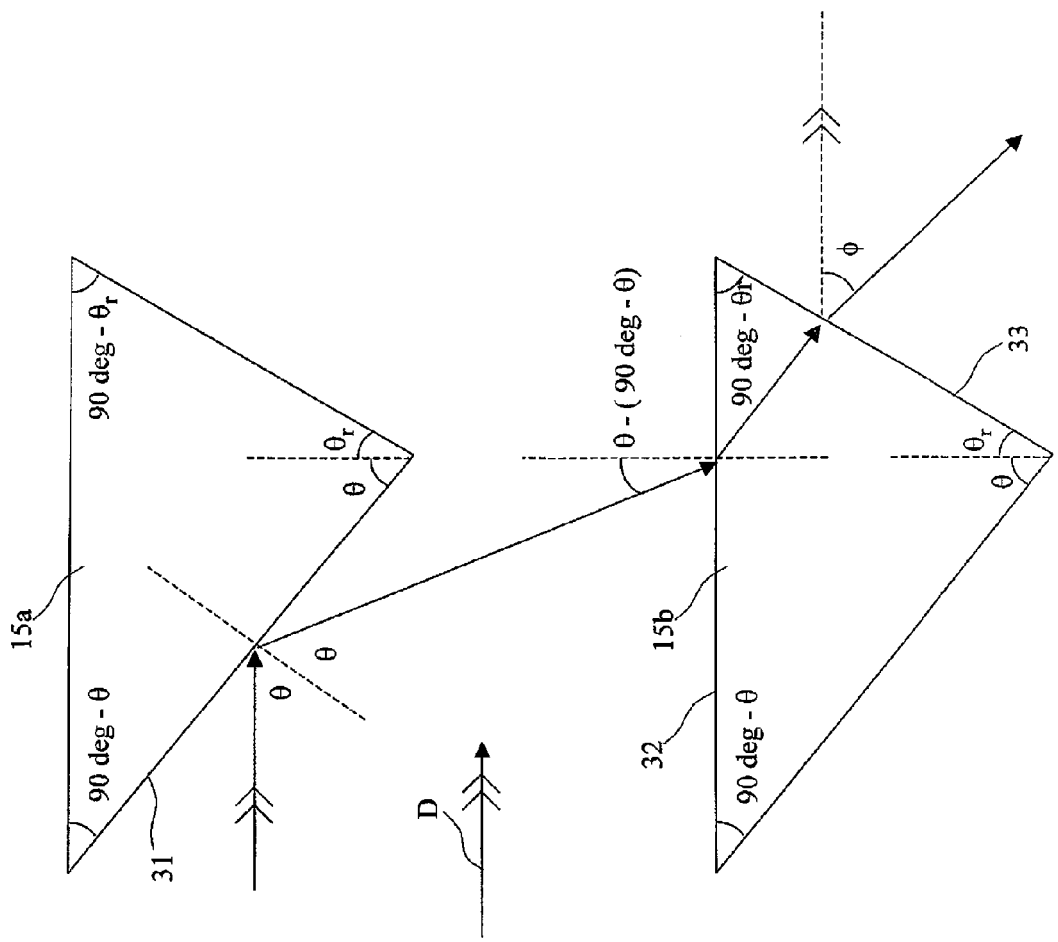
FIG. 4 is an explanatory diagram illustrating an optical path when the planar optical waveguide has MZIs and tap couples for multiple channels, and each channel has a groove causing reflection.

FIG. 4 is an explanatory diagram illustrating an optical path when the planar optical waveguide has MZIs and tap couples for multiple channels, and each channel has a groove causing reflection. In this case, a leaked light reflected by a groove causing reflection 15a may enter into another groove causing reflection 15b, and the optical path may be changed. The grooves causing reflection 15a and 15b include a reflection interface 31, an incident interface 32 serving as a second interface arranged in parallel with the direction D, and an output interface 33 serving as a third interface. Inclination angles of the reflection interface 31 and the output interface 33 with respect to the direction D are (90°−θ) and (90°−θ$_r$), respectively. At this occasion, the leaked light enters into the reflection interface 31 of the groove causing reflection 15$a$ with the incident angle θ. The leaked light reflected by the reflection interface 31 of the groove causing reflection 15$a$ enters into the incident interface 32 of the groove causing reflection 15$b$ with the incident angle θ−(90°−θ). The leaked light having entered into the groove causing reflection 15$b$ from the incident interface 32 is emitted to the clad layer through the output interface 33 of the groove causing reflection 15$b$.

Since the leaked light entering into the tap coupler with a low angle tends to cause a problem, an output angle φ of the leaked light with respect to the direction D is preferably 45 degrees or more. Therefore, it is preferable to arrange the incident interface 32 substantially in parallel with the axial direction, and an angle (θ+θ$_r$) formed by the output interface 33 and the reflection interface 31 preferably satisfies the expression 1 under the condition where the output angle φ is 45 degrees or more. The output angle φ of the leaked light with respect to the direction D is represented by the following expression where the refractive index of the clad layer is denoted with n$_1$, and the refractive index of the groove causing reflection 15 is denoted with n$_2$.

$$\phi = \theta_r - a\sin\left(-\frac{n_2}{n_1}\cos\left(a\sin\left(-\frac{n_1}{n_2}\cos 2\theta\right) + \theta_r\right)\right) \quad \text{[Expression 1]}$$

Figure 5:
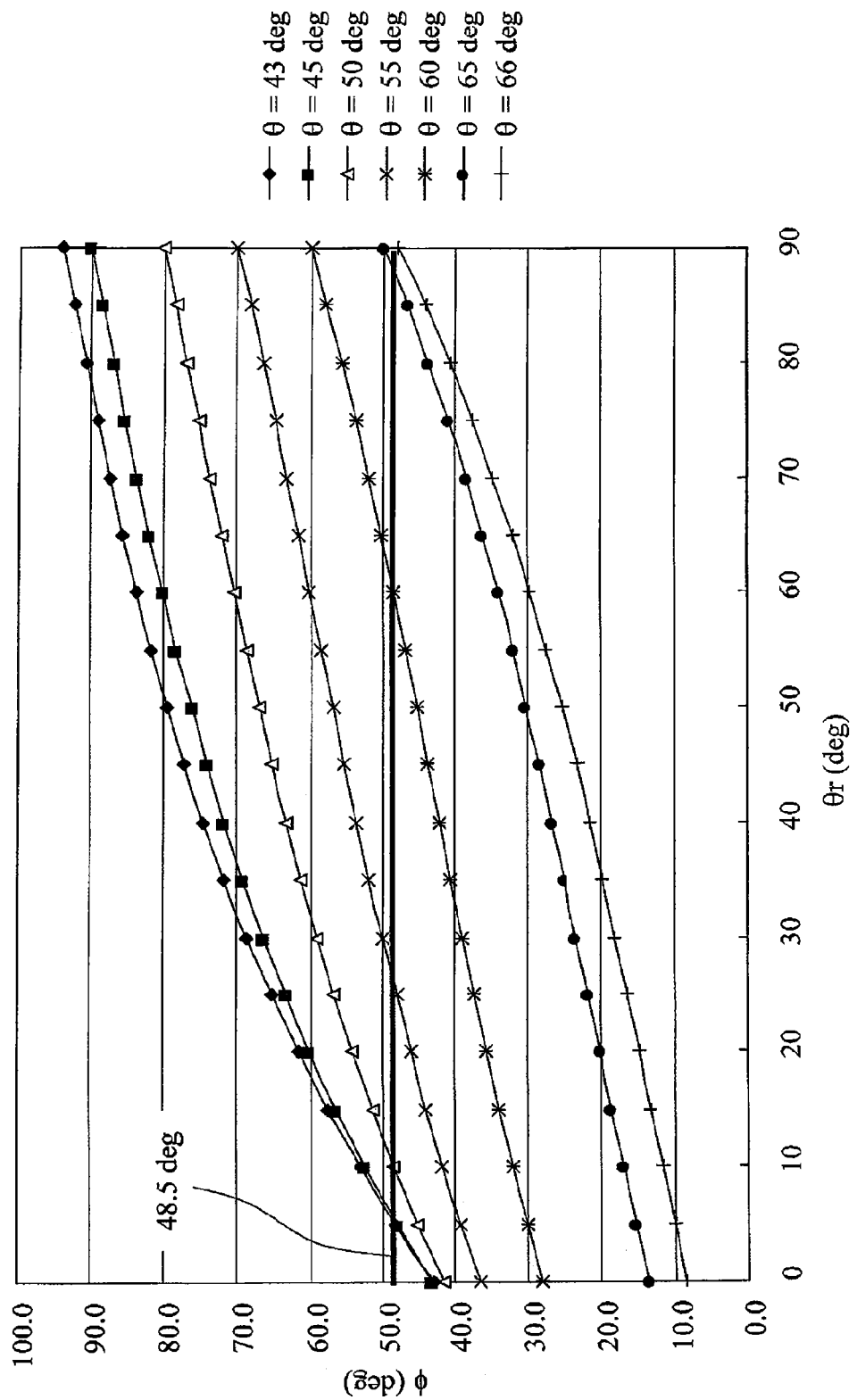
FIG. 5 is an example of evaluation of an incident angle $\theta$, an angle $\theta_r$, and an output angle $\phi$.

This expression is used to evaluate preferable ranges of the incident angle θ, the angle θ$_r$, and the output angle φ. FIG. 5 illustrates an example of evaluation. The incident angle θ is between 43 degrees and 90 degrees, in which range the leaked light is totally reflected by the reflection interface. For example, where the incident angle θ and the angle θ$_r$ are 60 degrees, the output angle φ is 48.5 degrees, so that the tap coupler is not affected.

Figure 6:
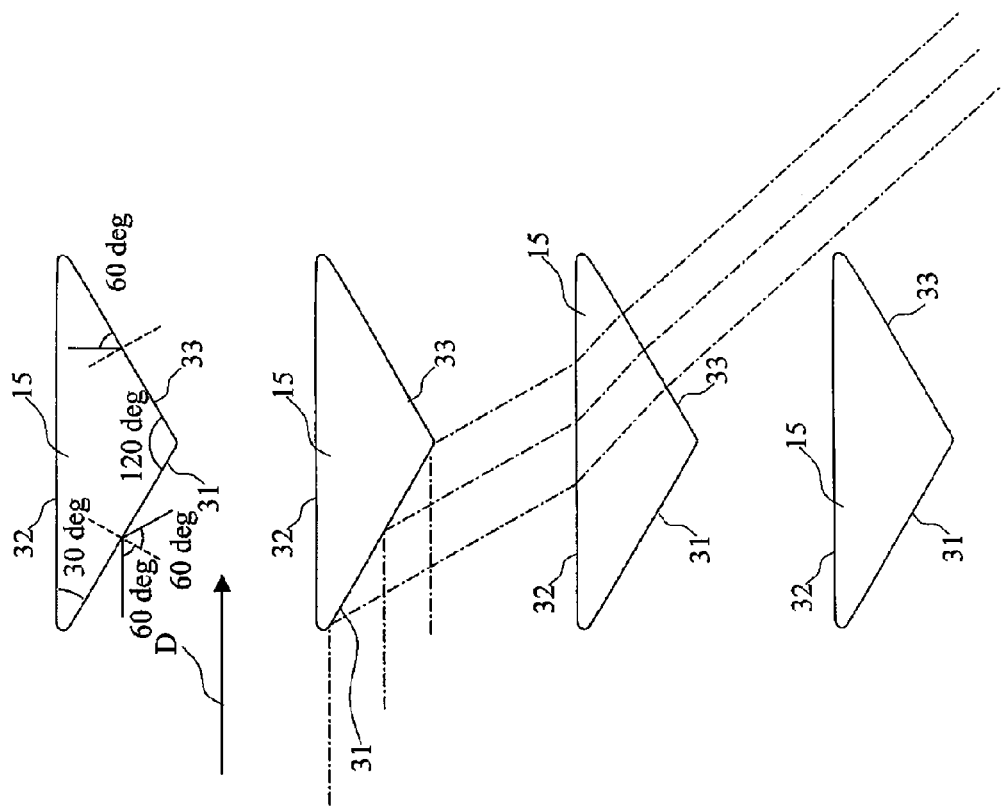
FIG. 6 is a specific example of an optical path when the planar optical waveguide has MZIs and tap couples for multiple channels, and each channel has a groove causing reflection.

FIG. 6 is a specific example of an optical path when the planar optical waveguide has MZIs and tap couples for multiple channels, and each channel has a groove causing reflection. Each groove causing reflection 15 is arranged such that an incident interface 32 is substantially in parallel with an axial direction D of the tap coupler and the angle between the incident interface 32 and the reflection interface 31 is 30 degrees and the angle between the reflection interface 31 and the output interface 33 is 120 degrees. When each groove causing reflection 15 is formed as an isosceles triangle in which the incident interface 32 is the base, and an apex angle formed by the two sides, i.e., the reflection interface and the output interface, is 120 degrees, the planar optical waveguide can have such a structure that the leaked light reflected by the reflection interface 31 of each groove causing reflection 15 does not enter into a subsequent tap coupler and tap couplers thereafter.

The groove causing reflection 15 preferably has a light shielding material for attenuating the intensity of the leaked light. For example, the groove causing reflection 15 is filled with a silicon resin based media mixed with carbon blacks generally used as a light shielding material. Since the groove causing reflection 15 has the light shielding material, the groove causing reflection 15 can attenuate the intensity of the leaked light incident through the incident interface 32. Further, the groove causing reflection 15 can also attenuate the intensity of the leaked light incident to the reflection interface 31 with the critical angle of the reflection interface 31 or less and the intensity of the leaked light that is not totally reflected by the reflection interface 31 due to a surface roughness of the reflection interface 31.

In the above explanation of the present embodiment, the embodiment is configured to prevent the leaked light leaked from the MZI from entering into the tap coupler, however, the present disclosure is not limited thereto. The optical circuit generating the leaked light is not limited to the MZI, and for example, this can be applied to a branching/coupling device, a wavelength multiplexing/demultiplexing device, an optical waveguide having a large curvature, and the like. The optical circuit having the problem of the leaked light entering thereinto is not limited to the tap coupler.

EXAMPLES

Figure 7:
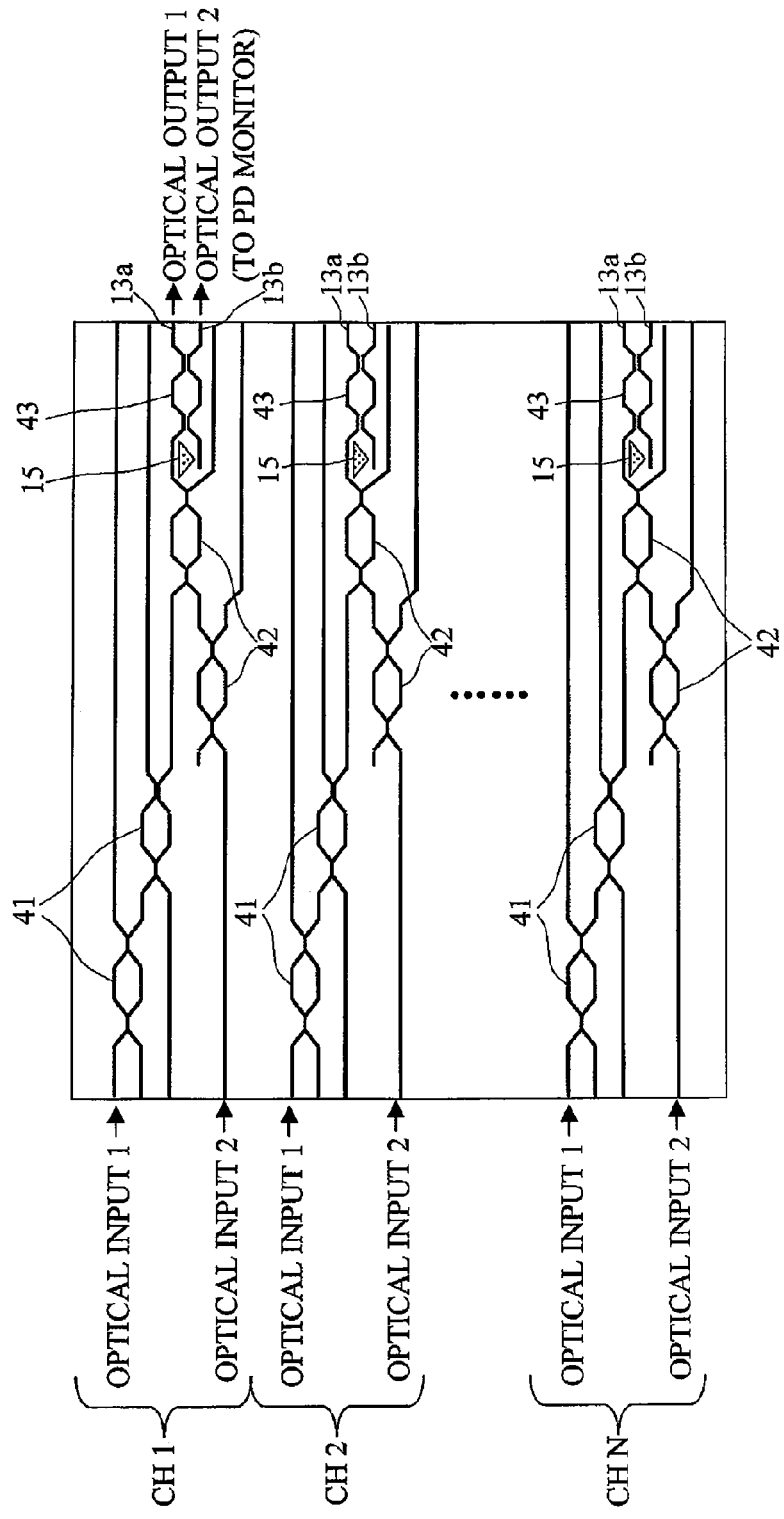
FIG. 7 is a schematic diagram illustrating a configuration of a planar optical waveguide according to the present example.

FIG. 7 is a schematic diagram illustrating a configuration of a planar optical waveguide according to the present example. The planar optical waveguide according to the example includes N channels of 2×1 Thermal Optical Switch (TOS). The TOS of each channel has a Variable Optical Attenuator (VOA) 41 and a VOA 42 constituted by MZIs. A tap coupler 43 arranged at a stage subsequent to the VOA 42 adjusts the signal level, and an optical output 1 and an optical output 2 are output from output ends 13$a$ and 13$b$. At this occasion, a ratio between the optical output 1 and the optical output 2 is obtained as a branching ratio of the tap coupler. In addition, as a comparative example, a branching ratio is also obtained in a case where the groove causing reflection 15 is not arranged as shown in FIG. 7.

Figure 8:
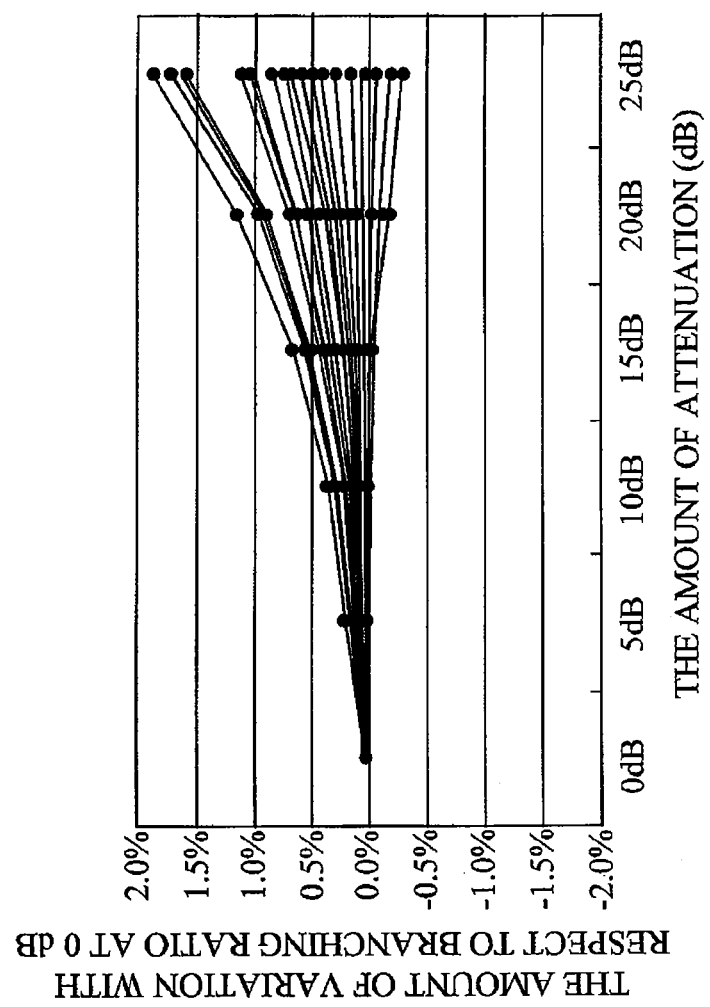
FIG. 8 is a branching ratio according to a comparative example which does not include a groove causing reflection 15.

FIG. 8 is a branching ratio according to the comparative example which does not include the groove causing reflection 15. A horizontal axis represents the amount of attenuation of the VOA 42, and a vertical axis represents the amount of variation with respect to a branching ratio at 0 dB. Herein, the branching ratio at 0 dB is a ratio between the optical output 1 and the optical output 2 when the VOA 42 does not attenuate the signal at all. In this example, the number of channels N is 38, and abnormal data are omitted. As the amount of attenuation of the VOA 42 increases, the amount of variation of the branching ratio increases or decreases due to the affect of the leaked light entering into the tap coupler 43. At 20 dB, the attenuation of the VOA 42 changes to a positive side, and in some channels, the amount of variation with respect to the branching ratio at 0 dB exceeds +/−0.5%.

Figure 9:
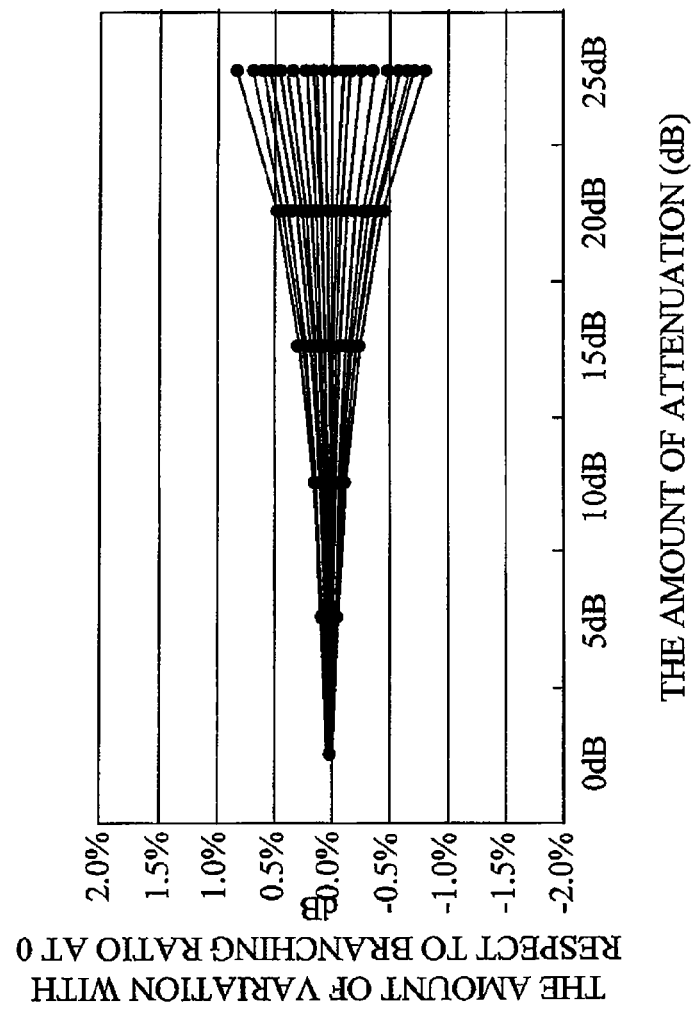
FIG. 9 is a branching ratio according to an example which includes a groove causing reflection 15.
Figure 10:
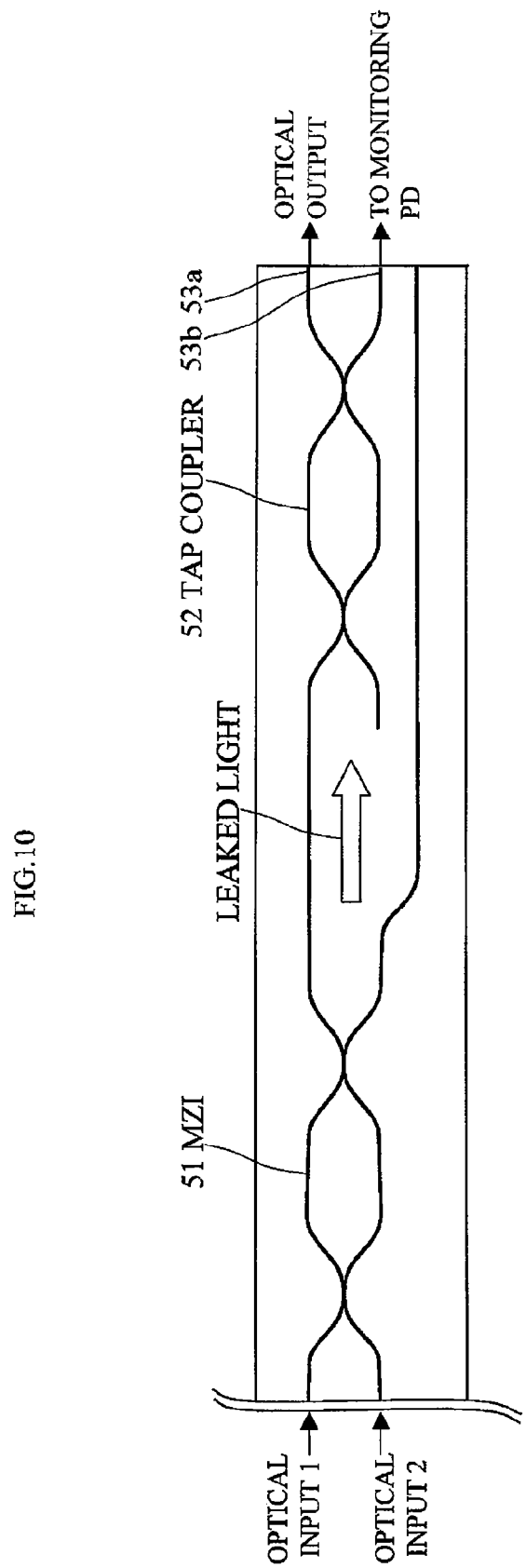
FIG. 10 is a block diagram illustrating an example of an optical module having a conventional planar optical waveguide.

FIG. 9 is a branching ratio according to an example which includes the groove causing reflection 15. The number of channels is 143, and abnormal data are omitted. As the amount of attenuation of the VOA 42 increases, the amount of variation of the branching ratio increases or decreases due to the affect of the leaked light entering into the tap coupler 43; however, since the groove causing reflection 15 is arranged, the amount of variation with respect to the branching ratio at 0 dB can be reduced to values within +/−0.5% even when the attenuation of the VOA 42 is 20 dB.

The present disclosure can be used for an optical communication device such as ROADM.

What is claimed is:
1. A planar optical waveguide comprising:
a clad layer;
an optical waveguide having a core embedded in the clad layer; and
a groove formed in the clad layer and having a reflection interface for totally reflecting, to the clad layer, a leaked light leaked from the optical waveguide to the clad layer, wherein the reflection interface is approximately vertical to clad layer.

2. The planar optical waveguide according to claim 1 further comprising:
a tap coupler,
wherein the reflection interface totally reflects the leaked light propagated to the tap coupler.

3. The planar optical waveguide according to claim 2, comprising a plurality of the grooves,
wherein each of the grooves includes:
an incident interface for receiving a leaked light reflected by the reflection interface of another one of the grooves; and
an output interface for outputting, to the clad layer, the leaked light entered into the groove through the incident interface,
and wherein the output interface outputs the leaked light with an angle of 45 degrees or more with respect to an axial direction of the tap coupler.

4. The planar optical waveguide according to claim 2, comprising a plurality of the grooves, wherein each of the grooves includes:
an incident interface for receiving a leaked light reflected by a reflection interface of another one of the grooves; and
an output interface for outputting, to the clad layer, the leaked light entered into the groove through the incident interface,
and wherein the incident interface is substantially in parallel with the axial direction of the tap coupler,
an angle between the incident interface and the reflection interface is 30 degrees, and
an angle between the reflection interface and the output interface is 120 degrees.

5. The planar optical waveguide according to claim 2, wherein an angle of an axial direction of the tap coupler with respect to a normal line of the reflection interface is equal to or more than a critical angle of the reflection interface but is equal to or less than 90 degrees.

6. A planar optical waveguide comprising:
a clad layer;
an optical waveguide having a core embedded in the clad layer;
a groove formed in the clad layer; and
a tap coupler,
wherein an angle θ of an axial direction of the tap coupler with respect to a normal line of a first interface of the groove is equal to or more than a critical angle.

7. The planar optical waveguide according to claim 6, comprising a plurality of the grooves, wherein
the grooves include a second interface and a third interface,
the second interface is substantially in parallel with the axial direction, and
an angle $(\theta + \theta_r)$ formed by the third interface and the first interface satisfies the following expression, $$\phi = \theta_r - a\sin\left(-\frac{n_2}{n_1}\cos\left(a\sin\left(-\frac{n_1}{n_2}\cos 2\theta\right) + \theta_r\right)\right)$$ [Expression 1]

$$\phi \geq 45°$$

where $n_1$ represents a refractive index of the clad layer, and $n_2$ denotes a refractive index of the groove.

8. The planar optical waveguide according to claim 6, wherein the groove includes a light shielding material for attenuating a intensity of a leaked light incident to the groove.

9. The planar optical waveguide according to claim 7, wherein the groove includes a light shielding material for attenuating a light intensity of a leaked light incident to the groove.

10. The planar optical waveguide according to claim 3 comprising a plurality of the grooves, and
wherein each of the grooves includes:
an incident interface for receiving a leaked light reflected by a reflection interface of another one of the grooves; and
an output interface for outputting, to the clad layer, the leaked light entered into the groove through the incident interface,
and wherein the incident interface is substantially in parallel with the axial direction of the tap coupler,
an angle between the incident interface and the reflection interface is 30 degrees, and
an angle between the reflection interface and the output interface is 120 degrees.

11. The planar optical waveguide according to claim 3, wherein an angle of an axial direction of the tap coupler with respect to a normal line of the reflection interface is equal to or more than a critical angle of the reflection interface but is equal to or less than 90 degrees.

12. The planar optical waveguide according to claim 4, wherein an angle of an axial direction of the tap coupler with respect to a normal line of the reflection interface is equal to or more than a critical angle of the reflection interface but is equal to or less than 90 degrees.

13. The planar optical waveguide according to claim 10, wherein an angle of an axial direction of the tap coupler with respect to a normal line of the reflection interface is equal to or more than a critical angle of the reflection interface but is equal to or less than 90 degrees.

14. The planar optical waveguide according to claim 1, wherein the groove includes a light shielding material for attenuating a light intensity of a leaked light incident to the groove.

15. The planar optical waveguide according to claim 2, wherein the groove includes a light shielding material for attenuating a light intensity of a leaked light incident to the groove.

16. The planar optical waveguide according to claim 3, wherein the groove includes a light shielding material for attenuating a light intensity of a leaked light incident to the groove.

17. The planar optical waveguide according to claim 4, wherein the groove includes a light shielding material for attenuating a light intensity of a leaked light incident to the groove.

18. The planar optical waveguide according to claim 5, wherein the groove includes a light shielding material for attenuating a light intensity of a leaked light incident to the groove.

19. The planar optical waveguide according to claim 10, wherein the groove includes a light shielding material for attenuating a light intensity of a leaked light incident to the groove.

20. The planar optical waveguide according to claim 11, wherein the groove includes a light shielding material for attenuating a light intensity of a leaked light incident to the groove.

21. The planar optical waveguide according to claim 12, wherein the groove includes a light shielding material for attenuating a light intensity of a leaked light incident to the groove.

22. The planar optical waveguide according to claim 13, wherein the groove includes a light shielding material for attenuating a light intensity of a leaked light incident to the groove.

* * * * *